A. P. MORROW.
CHUCK.
APPLICATION FILED MAY 11, 1911.

1,159,247.

Patented Nov. 2, 1915.

Witnesses
Joseph C. Stack.
R. W. Bishop

Inventor
Alexander P. Morrow
By Julian C. Dowell
his Attorney

UNITED STATES PATENT OFFICE.

ALEXANDER P. MORROW, OF ELMIRA, NEW YORK, ASSIGNOR TO E. HORTON & SON COMPANY, OF WINDSOR LOCKS, CONNECTICUT, A CORPORATION OF CONNECTICUT.

CHUCK.

1,159,247.  Specification of Letters Patent.  Patented Nov. 2, 1915.

Original application filed December 23, 1908, Serial No. 469,025. Divided and this application filed May 11, 1911. Serial No. 626,502.

*To all whom it may concern:*

Be it known that I, ALEXANDER P. MORROW, a citizen of the United States, residing at Elmira, in the county of Chemung and State of New York, have invented certain new and useful Improvements in Chucks, of which the following is a specification.

My invention relates to chucks having sliding jaws which grasp and hold the shank of a drill or other tool, this application being a division of my application filed December 23, 1908, Serial No. 469,025. No claim is made herein to the generic invention set forth and broadly claimed in my said application, the claims of this application being directed to a species of the invention which is shown but not specifically claimed in that application.

In using chucks, the jaws frequently become so set under the resistance offered the drill by the work that it is exceedingly difficult to release and retract the jaws and considerable power is expended, time lost, and inconvenience experienced in starting the releasing action of the chuck.

The object of my invention is to provide simple and efficient means whereby the jaws may be easily and quickly caused to relax their grip and then recede with the expenditure of less power and exertion than has previously been required to accomplish that result.

One construction wherein the object of my invention is attained is illustrated in the accompanying drawings and is hereinafter fully described, the novel features being indicated in the claims.

Figure 1:
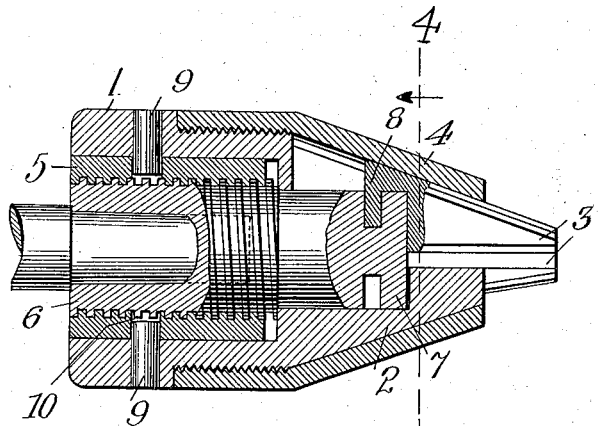
Figure 2:
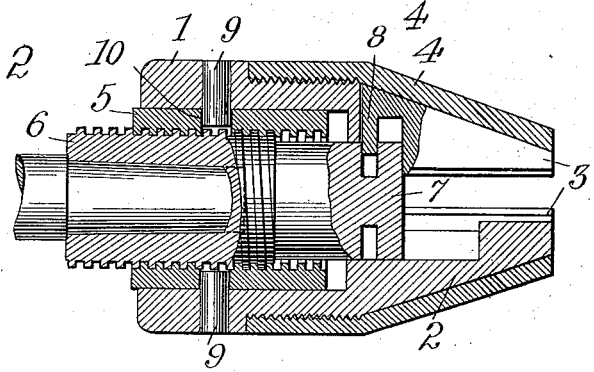
Figure 3:
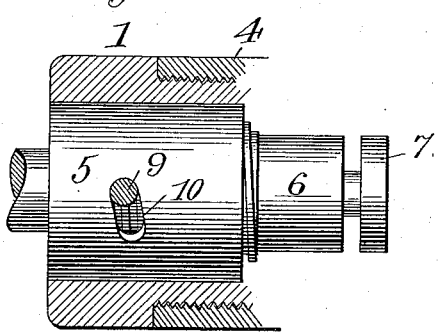
Figure 4:
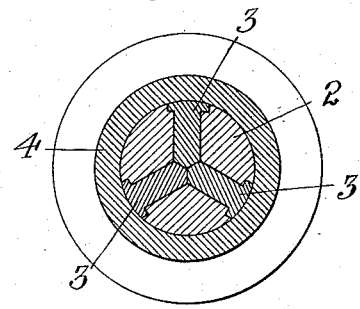

In the drawings, Figure 1 is a longitudinal sectional elevation of a chuck embodying my improvements, showing the jaws closed. Fig. 2 is a similar view showing the jaws open. Fig. 3 is a plan view, partly in section, of the releasing device. Fig. 4 is a transverse section on the line 4—4 of Fig. 1.

In the illustrated embodiment of my present invention, the chuck is provided with an outer tubular body or case 1 which has a smooth bore and the usual frusto-conical portion 2 constructed with longitudinal slots to receive the jaws 3. The jaws are confined in the longitudinal slots by a cap 4 and they may be provided with marginal ribs along their upper edges engaging recesses along the upper margins of the slots to aid in holding them in place and effecting their movement toward and from the axis of the chuck. It will be understood that the jaws are held against axial movement independently of the head, hereinafter described, and that the casing is given axial movement relative to the head to effect the closing and opening movements of the jaws.

Within the tubular body 1 is an internally threaded sleeve 5, and an externally threaded head, 6, the forward portion of said head being smooth to form a spindle journaled in the bore of the body and formed with an annular flange 7 at its end which is engaged by the hook-like ends 8 of the jaws. The threaded portions of the sleeve and the head engage, as shown, and permit relative longitudinal movement of said sleeve and head. One or more radial pins 9 are secured in the body or case and engage circumferential grooves or slots 10 in the sleeve 5 which are disposed at an angle to the axis of the chuck somewhat greater than the threads in the sleeve. It will be readily understood that if the body or case 1 be rotated, the pins 9 will be carried against the sides of the slots 10, which are inclined relative to the axis of the chuck, and, consequently, the case will be given an axial movement relative to the head which movement will be limited by contact of the pins with the ends of the slots.

It will be seen that while the jaws cannot be moved relative to the head 6 in an axial direction, the casing 1 and the part 4 may be moved axially relative to the jaws. When the jaws are to be opened or closed, the casing is rotated and the head is held stationary, or vice versa. The jaws being closed, as illustrated in Fig. 1, if the case 1 be rotated counter-clockwise (looking in the direction of the arrow), it will move freely around the sleeve 5 until the pins 9 engage the ends of the slots 10, whereupon the continued rotation of the case will cause the sleeve to rotate therewith on the head. The travel of the pins against the inclined walls of the slots effects an axial movement of the case while the sleeve remains stationary, so that an initial radial releasing movement will be imparted to the jaws prior to the rotary movement of the sleeve on the head. When the ends of the slots are engaged by the pins 9, this independent or preliminary movement of the case ceases and the sleeve is then rotated by the case to effect further radial movement of the jaws, the sleeve then moving axially upon the head, while the jaws rotate with the case, resulting in relative radial movement between the jaws and the head, and relative longitudinal movement between the jaws and the case. It will thus be seen that I have interposed in the train of elements by which the jaws are operated, a cam and stop device which will effect an initial or preliminary quick release of the jaws, the inclined walls of the slots acting on the pins as cams to cause the movement and the ends of the slots constituting stops to limit the same. The power required to start the screw is, consequently, reduced and the manipulation of the chuck made easy and rapid from the initial or starting point to the end of the operation.

It is to be understood that my improvements are applicable to other forms of chucks, and that the particular chuck shown is merely illustrative and not restrictive. It is also to be understood that within the scope of the appended claims minor changes may be made in details of construction without departing from the spirit of the invention.

Having thus described my invention, what I claim and desire to secure by Letters Patent is:

1. In a chuck, the combination with a rotatable case, and jaws movable radially by axial movement of the case relative to the jaws, of a head within the case connected with the jaws and having rotary and axial movement relative to the case, a sleeve engaging the head and having rotary and axial movement relative thereto, and connections between the case and the sleeve for effecting an initial limited relative movement of the case prior to the movement of the sleeve on the head.

2. In a chuck, the combination with a case and jaws movable radially by axial movement of the case relative to the jaws, of a member having axial movement relative to the case and jaws, a member fixed against axial movement with relation to the jaws and having threaded engagement with said axially movable member, and a cam and stop device connecting the case and said movable member, the cam being disposed at a greater angle to the axis of the member than the threads thereon, whereby the case will have a partial movement independent of the member to initially relax the jaws and will then actuate the member to fully open the jaws.

3. In a chuck, the combination of a head provided with an annular flange, jaws engaging said flange and movable radially to and from the axis of the head, a case journaled on the head and operatively connected to the jaws to move the same radially by axial movement of the case relative to the jaws, a sleeve mounted on the head and rotatable thereon and movable axially relatively thereto, and means connecting the sleeve and the case for initially slightly moving the case axially as it is rotated.

4. In a chuck, the combination of a case, a head therein provided with an annular flange, jaws engaging the annular flange and movable radially toward and from the axis of the head, the case being rotatable and movable axially relatively to the head and operatively connected to the jaws to move the same radially by its own axial movement, and means including a cam between the head and the case for moving the case axially as it is rotated.

5. In a chuck, the combination of a case, jaws movable radially by axial movement of the case relative to the jaws, a head fitted in the case and engaged by the jaws, a sleeve threaded upon the head and having a circumferential cam slot, and a pin carried by the case and engaging said slot.

6. In a chuck, the combination of a threaded head, jaws arranged radially about the axis of the head, means on the head for holding the jaws against endwise movement relative thereto, a rotary threaded sleeve section engaged with the head and movable axially thereof during its rotation, and means engaged by said sleeve section and by the jaws for imparting radial movement to the jaws by the axial movement of the sleeve section, said means having a limited rotary and axial movement relatively to the sleeve section for releasing the jaws from their gripping position.

7. In a chuck, the combination of a head, jaws movable radially to and from the axis of the head, means for holding the jaws against axial movement relative to the head, a case journaled on the head and operatively connected to the jaws to move the same radially by axial movement of the case relative to the jaws, a sleeve mounted on the head and rotatable thereon and movable axially relative thereto, and means connecting the sleeve and case for initially moving the case axially as it is rotated.

8. In a chuck, the combination of a case, a head therein, jaws movable radially toward and from the axis of the head, means for holding the jaws against axial movement relative to the head, the case being rotatable and movable axially relative to the head and operatively connected to the jaws to move the same radially by its own axial movement, and means including a cam between the head and the case for moving the latter axially as it is rotated.

9. In a chuck, work engaging means and operating means therefor comprising two movable, interconnecting parts to receive and to convey motion in causing engagement and release of the work-engaging means, and including an outer longitudinally movable case, said parts having engaging means to effect a joint movement in tightening and releasing the work, and whereby one of said parts is movable with respect to the other by a predominating, relatively fast movement, to effect initial release of the work-engaging means, and whereby the other of said parts is movable with respect to the first by a subsidiary, relatively slow movement, to finally tighten the hold of the work-engaging means.

10. In a chuck, work-engaging means and operating means therefor comprising two movable, interconnecting parts to receive and to convey motion in causing engagement and release of the work-engaging means, and including an outer longitudinally movable case and longitudinally stationary jaws, said parts having engaging means to effect a joint movement in tightening and releasing the work, and whereby one of said parts is movable with respect to the other by a predominating, relatively fast movement, to effect initial release of the work-engaging means, and whereby the other of said parts is movable with respect to the first by subsidiary, relatively slow movement, to finally tighten the hold of the work-engaging means.

11. In a chuck, work-engaging means and operating means therefor comprising two movable interconnecting parts consisting of an outer case, a shell whereon it is mounted, a threaded head upon which said shell is rotatably mounted, and jaws connected to said head and outer case, to receive and to convey motion in causing engagement and release of the work-engaging means, said parts having engaging means to effect a joint movement in tightening and releasing the work, and whereby one of said parts is movable with respect to another by a predominating, relatively fast movement, to effect initial release of the work-engaging means, and whereby said other of said parts is movable with respect to the first by a subsidiary, relatively slow movement, to finally tighten the hold of the work-engaging means.

In testimony whereof I affix my signature, in presence of two witnesses.

ALEXANDER P. MORROW.

Witnesses:
H. W. PATON,
FLORENCE T. FOSTER.

Copies of this patent may be obtained for five cents each, by addressing the "Commissioner of Patents, Washington, D. C."